Oct. 16, 1962 J. G. SCHOTTHOEFER 3,058,407
MULTIPLE FILM CAMERA
Filed Oct. 5, 1960 2 Sheets-Sheet 1
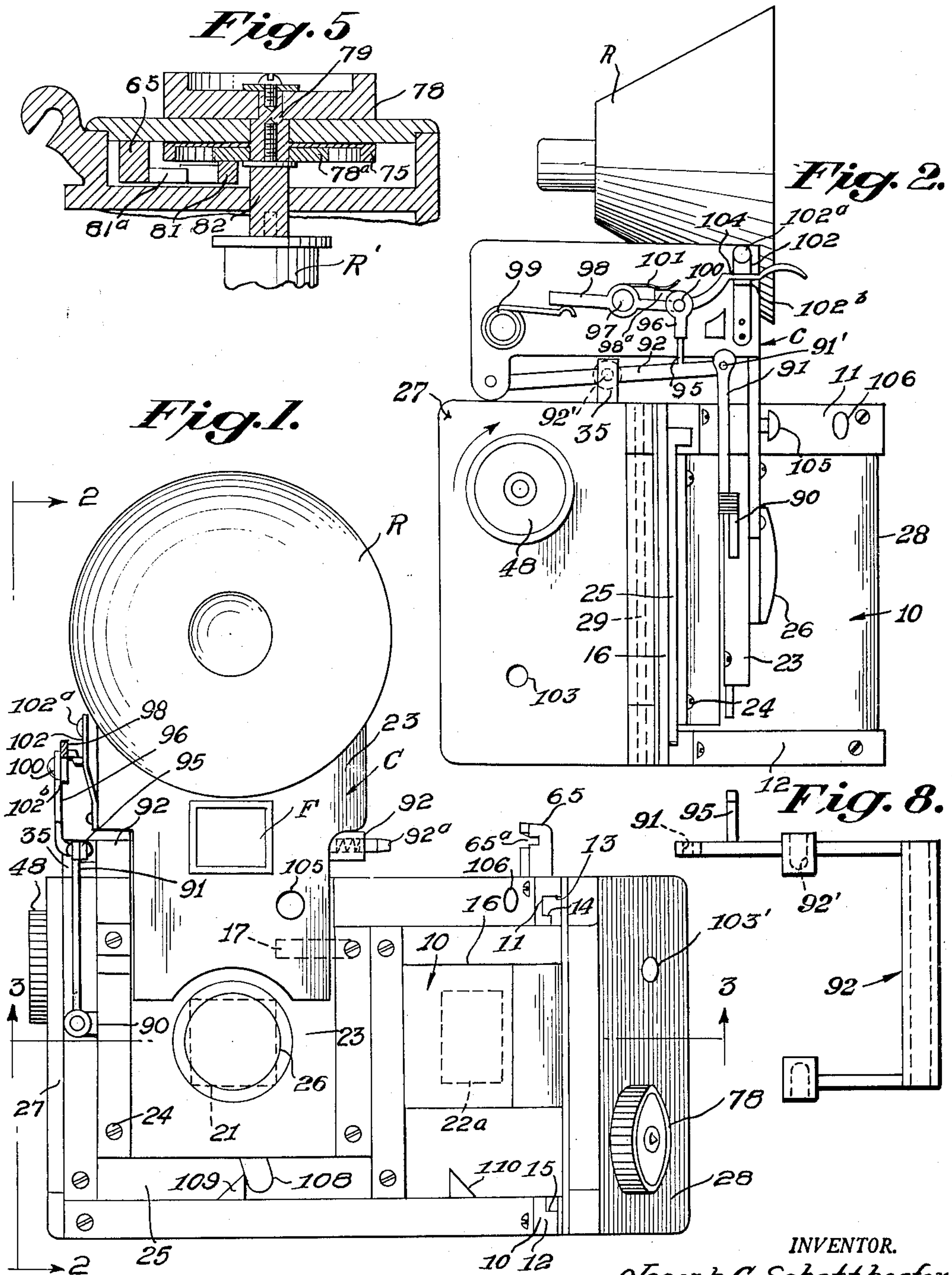
INVENTOR.
Joseph G. Schotthoefer
BY
James Atkins
ATTORNEY MULTIPLE FILM CAMERA
Filed Oct. 5, 1960
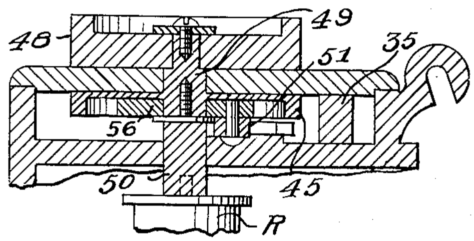
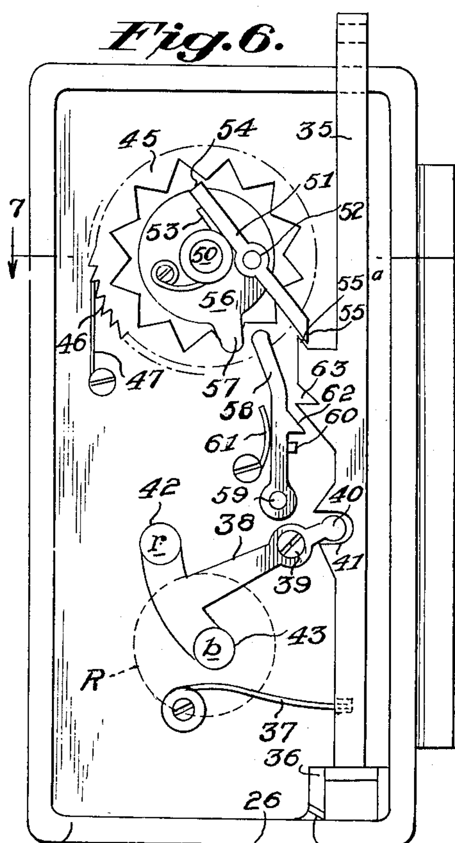
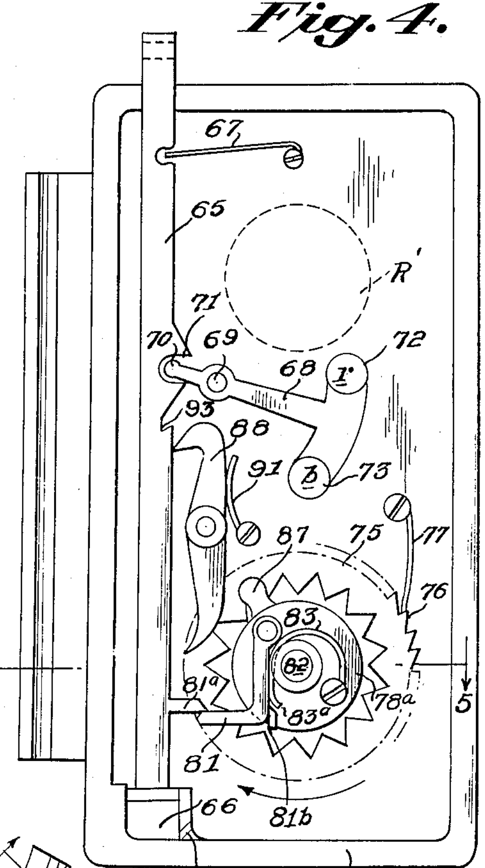
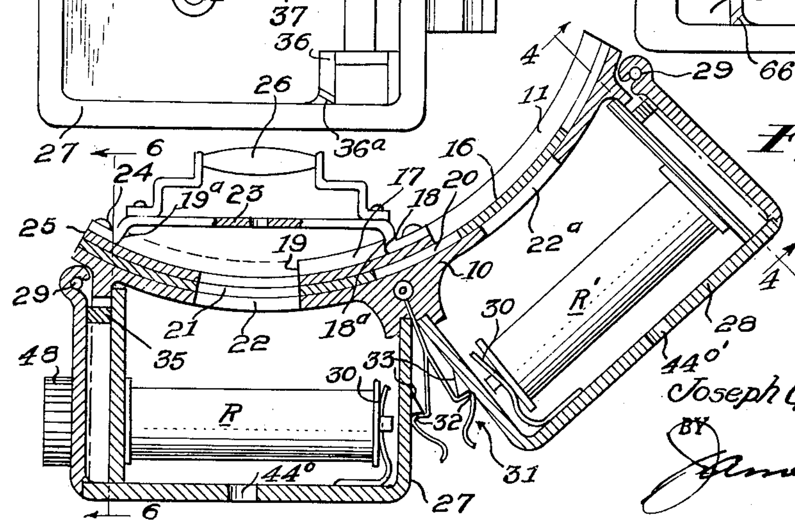
INVENTOR.
Joseph G. Schotthoefer
BY
James Atkins
ATTORNEY.

3,058,407

MULTIPLE FILM CAMERA

Joseph G. Schotthoefer, 20030 Wexford, Detroit 34, Mich.

Filed Oct. 5, 1960, Ser. No. 60,715
4 Claims. (Cl. 95—31)

The present invention relates to a multiple film camera.

The invention is more particularly concerned with a camera which is characterized by the provision of an attachment for a standard camera body having a reflector and a finder, and a primary object of the invention is the provision of means for supporting a pair of films which may both be of the black and white type or preferably a black and white film and a color film, together with means for selectively bringing either of the films into exposure with the camera body.

A further and more specific object of the invention is to provide an arcuate housing for securement to a standard camera body, and which is adapted to releasably support a pair of films, the housing being provided with light admitting openings controlled by an apertured plate slidably supported in said housing, and a lens carrier supported by the plate.

A further object of the invention is to provide film control means for each of the film spools which are disposed within the housing, and which control means comprises a member projecting outwardly of each of the housings.

A still further object of the invention is the provision of film supporting members which are swingably supported by said housing.

Other objects and advantages of the invention will become apparent in the course of the following detailed description taken in connection with the accompanying drawings, wherein:

FIGURE 1 is a front elevational view of the improved two-film camera.

FIGURE 2 is a side elevational view of the camera as observed in the plane of line 2—2 of FIGURE 1.

FIGURE 3 is a horizontal sectional view as observed in the plane of line 3—3 on FIGURE 1, in the direction of the arrows.

FIGURE 4 is an enlarged elevational view as observed in the plane of line 4—4 on FIGURE 3.

FIGURE 5 is a horizontal sectional view as observed in the plane of line 5—5 on FIGURE 4.

FIGURE 6 is an enlarged elevational view as observed in the plane of line 6—6 on FIGURE 3.

FIGURE 7 is a horizontal sectional view as observed in the plane of line 7—7 of FIGURE 6.

FIGURE 8 is a plan view of a rockable yoke removed.

Referring now in detail to the drawings, the improved camera will be seen to comprise an attachment for a standard camera body C including a reflector R, a finder F, and a shutter or lens 26.

The improved attachment comprises a housing 10 which, as shown in FIGURE 3, is of horizontal arcuate form and which is provided with upper and lower guideways 11 and 12, as is clearly indicated in FIGURE 1. The upper guideway 11 comprises an upper horizontal wall 13 and a lower horizontal wall 14, while the lower guideway 12 comprises only a lower horizontal wall 15. The upper guideway takes the horizontal and radial thrust, while the lower guideway takes only the radial thrust.

An arcuate plate 16, as shown in FIGURE 3 is slidably supported in the housing 10 and same is provided with a stop 17 having opposed abutment ends 18 and 19 for respective engagement with abutments 18*a* and 19*a*, and the plate 16 is further provided with rectangular apertures 20 and 21 for selective alignment with apertures 22 and 22*a* in the housing 10.

A lens carrier 23 is secured at 24 to an arcuate plate

25, which is slidably disposed in the guideways 11 and 12, and the carrier 23 is provided with said conventional lens 26.

A pair of film roll supporting members 27 and 28 are provided for releasable support of a pair of film rolls R and R′, one of which may be of the black and white type and the other of which may be of the color type, and the rolls R and R′ are releasably retained in operative position in the members 27 and 28 by means of spring brackets 30, as is clearly shown in FIGURE 3, the film rolls always being in the same relation to the apertures 22 and 22*a*.

The film supporting members 27 and 28, which as shown in FIGURE 3, are of box-like form and each thereof is swingably supported on a vertical pivot member 29 for facilitating placement and removal of the respective film rolls R and R′.

The members 27 and 28 are releasably retained in closed position by means of a spring latch 31 which is carried by said housing 10 and which includes opposing shoulders 32 which are releasably engageable with projections 33 on the said film supporting members 27 and 28.

In enlarged FIGURES 6 and 7 is shown means for safety control in the exposure of films in member 27 and wherein it will be seen that the film supporting member 27 is provided with means for indicating whether or not the film is being exposed, and which means comprises an upright member 35 whose upper end is slidably disposed in and projects through the upper end of the supporting member 27, and the lower end of which rests in a dash pot 36, having vent 36*a*, and the member 35 is normally urged upwardly by means of a leaf spring 37.

A T-member 38 is pivotally supported on member 27 as at 39, and which member is provided with an extension 40 which is received in a slot 41 in the member 35.

The opposite end of the member 38 is provided with circular red (*r*) and black (*b*) indicators 42 and 43 which are selectively alignable with an opening 103 in member 27.

An internal ratchet wheel 45 is disposed in driving engagement with the film roll R. The said wheel 45 is provided with external ratchet teeth 46 which are engaged by a spring pawl 47 to avoid retrograde movement of the ratchet wheel 45.

A hand wheel 48 is disposed externally of the housing and same is attached to a member 49, as is indicated in FIGURE 7, and which member 49 is attached to the film roll R releasably-engaging shaft 50.

A detent pawl 51 is pivotally supported at 52 on a free floating cam disc 56 and is spring urged in a clockwise direction by means of a spring 53. The said pawl 51 is provided with a square end 54 which cooperates with the teeth of the internal ratchet wheel 45, and the opposite end of the pawl is provided with a bevel end 55 which normally engages a triangular projection 55*a* on the member 35.

The free floating cam discc 56 is rotatably supported on the shaft 50 and is provided with a cam 57.

A second pawl 58 is pivoted at 59 and same is provided with a square projection 60 and a triangular projection 62 which is receivable in a triangular notch 63 in the member 35.

In FIGURES 4 and 5 is shown means similar to that shown in FIGURES 6 and 7 for control of the other spool R′ in member 28. Such means comprises an upright member 65 whose lower end rests in a dash pot 66, having vent 66*a*, and the said member 65 is normally urged upwardly by means of a spring 67. At this point, it is to be observed that members 35 and 65 project above the upper ends of the respective members 27 and 28.

A T-member 68 is pivotally supported at 69 and same is provided with an extension 70 which is received in a slot 71 in the member 65. Red (*r*) and black (*b*) indicators, which are carried by member 68, are indicated at 72 and 73, respectively, and which are selectively alignable with an opening 103' in a wall of member 28.

A ratchet wheel 75 is provided with teeth 76 which are engaged by a spring pawl 77.

A free floating cam disc 78*a* is rotatably supported on shaft 82 and is provided with a cam 87. A pawl 81 is pivotally supported on disc 78*a* and which is biased by a spring 83 into engagement with a lug 81*a* on member 65. A hand wheel 78 is attached to a member 79, FIGURE 5, which in turn is attached to film roll engaging shaft 82.

A ratchet pawl 88, corresponding to pawl 58 in FIGURE 6, is backed by a spring 91.

Referring now to FIGURE 2, a shutter trip is indicated at 90, and a connecting rod 91 is disposed between the shutter trip and a yoke 92 which is pivoted to the member 35 at 92' and to the rod 91 at 91'. The yoke 92 is provided with a spring loaded pin 92*a* for engaging within notch 65*a* of member 65, as shown in FIGURE 1.

The yoke 92 is provided with an upstanding projection 95 which is normally engaged by a pawl 96 pivotally supported at 100 on a lever 98, one end of which is reacted upon by a spring 99.

A spring 101, which engages a seat 98*a* on lever 98, normally retains pawl 96 coaxial with and in engagement with the projection 95.

The lever 98 is normally engaged by a spring button trip member 102 which is provided with a button 102*a*.

The trip member 102 is further provided with a projection 102*b* on which a finger engageable extension 104 of the lever 98 is normally disposed, and which is disengageable therefrom. A lock button 105 is provided which is adapted for contacting an opening 106, as is hereinafter set forth in the description of the operation of the structure of FIGURES 6, 7, 4 and 5.

Having set forth the structural features of the improved camera, the operation thereof in a picture taking procedure, as is particularly shown in FIGURES 6 and 7, is as follows:

With the view being correct, the button 102*a* on the spring pawl 102 is pressed by a finger of the operator whereby the lever 98 is released from the trip member projection 102*b*, and same is urged down by the spring 99. At the same time, member 35 is forced down, being slightly retarded by the dash pot 36. At the same time, the connecting link 91 trips the shutter, as well as the flash bulb if additional light is required. Since lever 98 pivots at 97, pawl 96 slides off its contact point or projection 95 after member 35 has been forced down to a position to complete its function.

As the member 35 is forced downwardly and released at 55*a*, and as pawl 58 is urged by spring 61, it hooks into the notch 63 and is held thereby.

At the same time, the T-member 38 pivots about 39 and brings indicator 43 to a position visible through opening 103, thereby indicating that the film has been properly exposed.

In the procedure for a succeeding exposure, the hand wheel 48 is turned clockwise until the film is in proper position and which is visible through opening 44, FIGURE 3. This operation requires several turns of the hand wheel. On the first turn of the wheel, all of the functions of the several members in member 27 are completed.

These functions are as follows: In the downward movement of member 35, pawl 51 is released at 55 and 55*a*, the pawl being urged toward its released position by means of the spring 53, pawl 51 engages at 54 with a tooth of the internal ratchet 45, the hand wheel 48 being in its turning operation, turns the cam disc 56 for one complete rotation, whereby cam 57 engages the pawl 58 and thereby releases the projection 62 from the notch 63 and then member 35 is urged upwardly by means of the spring 37, whereby pawl 51 is released from engagement with the hand wheel 48 which is then free to complete its turn.

As member 35 is urged upwardly, the member 38 is pivoted about its pivot 39 and brings indicator 42 to the position of indicator 43, as shown in FIGURE 6 and a fresh film is visible through opening 44.

Upon the upward movement of member 35, the yoke 92 is urged upwardly to its original position, leaving trip member 98 in its down position since the pawl 96 is not then in direct contact with the projection 95. The member 98 at this stage is left down as a safety factor, so that the shutter cannot be tripped until the member 98 is raised by the finger extension 104 of the member 98. In lifting up on extension 104, pawl 96 urged by spring 101 makes contact with the projection 95 again and is thereby in position for tripping.

The change from one of the films to the other, as from a black and white film to a color film, is carried out as follows:

Pull out the lock button 105, slide the lens carrier 23 to the left so that lock button 105 engages the opening 106 (FIGURE 2). At the same time, the yoke 92 and its spring load pin 92*a* enters the opening 65*a* in member 65 (FIGURE 1).

The functions in film carrier member 28 are substantially the same as in the film carrier 27 as above fully described. In the shifting of the lens carriers, the abutment 19*a* contacts the slide 16 at 19 whereby the aperture or port 22 is closed and aperture 20 is aligned with aperture 22*a* as well as the lens 26. In shifting from black and white film to color film, the shutter operating lever 108 engages an abutment 110, which changes the shutter control opening from relatively small to relatively large, and in shifting back a vice-versa operation occurs at 109.

It is to be understood that the form of this invention herewith shown and described is to be taken as a preferred embodiment of the same, and that various changes in the shape, size and arrangement of parts may be resorted to, without departing from the spirit of the invention or the scope of the subjoined claims.

Having thus described my invention, I claim:

1. A dual film camera comprising an arcuate support and guide member including a pair of arcuate channel guides adjacent the longitudinal edges thereof, a camera lens and finder unit slidable longitudinally of said support and guide member and having flange elements at the opposite longitudinal edges thereof engageable within said channel guides allowing said unit to be shifted bodily toward and from the opposite ends of the support and guide member, a pair of film carrier box members containing film spool means and hingedly secured to said support and guide member near the opposite ends of the latter and swingable horizontally relative thereto, quick detachable spring latch means common to said box members between the opposed inner sides of the same and mounted upon the support and guide member near the longitudinal center thereof, whereby said box members may be quickly opened and closed, an arcuate slide plate carried by said lens and finder unit and disposed between said unit and said support and guide member and having a pair of spaced apertures, said arcuate support and guide member having a companion pair of spaced apertures arranged to coact with the apertures of said slide plate, whereby the latter may cover one aperture of the support and guide member and uncover the other aperture thereof when shifted toward the opposite ends of the support and guide member, and abutment means on said camera lens and finder unit for limiting the extent of sliding movement of the unit and said slide plate relative to the support and guide member and controlling the registration of said coacting apertures of the slide plate and the support and guide member.

2. A dual film camera according to claim 1, and a movable visual indicator device mounted upon each film carrier box member and operating in response to movement of the film spool means of the box members and operation of the camera shutter trip means to indicate to the operator whether or not the particular film in either box member has been exposed.

3. A dual film camera comprising an arcuate support and guide member, a camera lens and finder unit slidably mounted upon the support and guide member for movement longitudinally thereof, a pair of quickly detachable separate film carrier box members carried by said support and guide member, independently operable film spool means within each film carrier box member and operable from the exterior of the box member, spaced film exposure apertures in said support and guide member adjacent to said film carrier box members to selectively expose the films therein, coacting light aperture and closure means movable with said camera lens and finder unit upon said support and guide member for selectively covering and uncovering said film exposure apertures of the support and guide member adjacent said film carrier box members, positive stop means to limit the movement in each direction of the camera lens and finder unit and said light aperture and closure means upon the support and guide member, a camera shutter trip element carried by said camera lens and finder unit and movable therewith, visual film exposure indicator means movably mounted upon each film carrier box member and operable in conjunction with said trip element, and a yoke member connected with the lens and finder unit and movable therewith upon the arcuate support and guide member and adapted to selectively actuate the visual indicator means of each film carrier box in proper relation to the operation of said shutter trip element as the lens and finder unit is shifted back and forth upon the support and guide member.

4. A dual film camera according to claim 3, and retarding dashpot means within each film carrier box and connected with said film exposure indicating means therein to retard the rapidity of movement of the same and thereby avoid vibrating the dual film camera.

References Cited in the file of this patent

UNITED STATES PATENTS

| | | |
|---|---|---|
| 2,384,655 | Stewart | Sept. 11, 1945 |
| 2,616,342 | Thompson | Nov. 4, 1952 |